Figure 1:
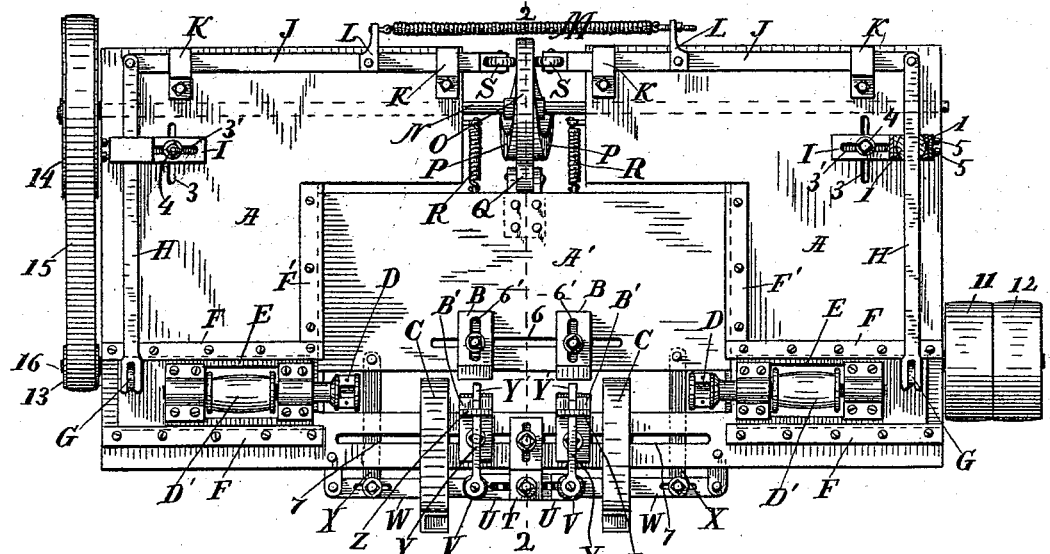
Figures 2, 3, 4:
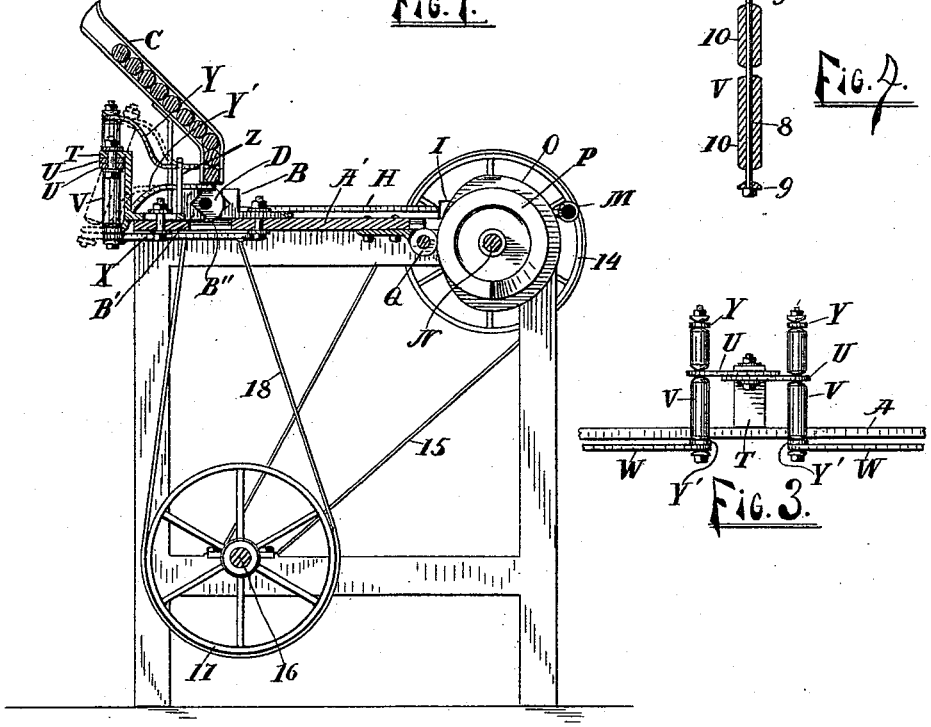

(No Model.)

P. DOSCH.
CHUCKING MACHINE AND GAGE LATHE.

No. 490,406. Patented Jan. 24, 1893.

WITNESSES:
Arthur C. Denison
Harry P. Van Wagner

INVENTOR
Peter Dosch
BY
Edward Taggart
his ATTORNEY.

United States Patent Office.

PETER DOSCH, OF GRAND RAPIDS, MICHIGAN, ASSIGNOR TO THE FOX MACHINE COMPANY, OF SAME PLACE.

CHUCKING-MACHINE AND GAGE-LATHE.

SPECIFICATION forming part of Letters Patent No. 490,406, dated January 24, 1893.

Application filed November 11, 1891. Serial No. 411,602. (No model.)

*To all whom it may concern:*

Be it known that I, PETER DOSCH, a citizen of the United States, residing at the city of Grand Rapids, in the county of Kent and State of Michigan, have invented a certain new and useful Chucking-Machine and Gage-Lathe, of which the following is a specification.

The nature of this invention relates more particularly to a chucking machine adapted to chuck both ends of a piece of stock simultaneously, and is especially useful in chucking chair spindles and other spindles where both ends are chucked.

The object of this invention is, first, to automatically feed the spindle or stock to the chucking knife or cutters; second, to chuck both ends of the spindle or stock simultaneously in order to save the time and expense ordinarily required; and other objects hereinafter specified. These objects I accomplish by means of the mechanism illustrated in the accompanying drawings, in which—

Figure (1) is a plan view of a machine constructed in accordance with my invention; Fig. (2) is a sectional view on line 2—2 of Fig. (1) for the purpose of showing the mechanism for operating the table and parts connected therewith; Fig. (3) is an elevation of the vibrating posts operating a portion of the feeding device; and Fig. (4) is a vertical sectional view of one of these vibrating posts, showing the construction thereof.

Similar letters and figures refer to similar parts throughout the several views.

A. is the frame, made preferably of metal, and supported upon legs or in any other suitable manner.

A' is a reciprocating table or frame supported upon the main framework of the machine, and connected to the feeding device, and operated by cams and springs as hereinafter described.

B. B' are the jaws of the clamping device which hold the spindle or stock while operated upon by the chucking cutter heads.

C. C. are the feed ways, forming a hopper into which the stock is fed, and from which the stock is taken and carried to the cutters.

D. D. represent the revolving cutters which chuck the ends of the spindle.

D' represents the mandrels upon which the cutters are supported.

E. E. are yoke bearings for the mandrels. These yoke bearings are adapted to move so as to give a longitudinal movement to the cutters in order to chuck the ends of the spindles.

F. F. are ways for the yoke bearings allowing for said longitudinal motion of the cutters.

G. are studs in the yoke, and engage with the forked lever H.

H. is a forked lever engaging with the frame bearing the mandrels by means of the studs G., and turning upon a fulcrum which is also adjustable, shown at I.

J. is a push rod pivoted to the lever H. and carrying a friction roller S., which friction roller S. is kept in contact with the cam surface P., said cam surface P. being rotated upon a cam wheel.

It will be observed that the parts are duplicated, the cam wheel having two cams, one on either side, for operating the levers and connections on either side, so that the chucking cutter-heads are moved simultaneously forward and backward for the purpose of chucking the ends of the spindle, and releasing the same from the chucking knives. The rods J. move in bearings K. K., and are each provided with a projection L. The projections L. are connected by means of a spring M., which spring holds the rollers S. of the push rods J. in contact with the cam in order to give the forward and backward motion to the cutter-heads. The cam wheel is mounted upon a shaft N., and this cam wheel has a cam on its periphery shown in the drawings by O., which peripheral cam bears upon a friction roller Q., which friction roller Q. is attached to the table or frame A'. The table or frame A' is moved forward by the revolution of the cam wheel, and is withdrawn by means of the springs R. R. The forward motion of the table has the effect to clamp the stock between the clamps B. B', thereby holding the same in position while the cutting knives D. D. advance upon the ends of the spindle thus held, finishing the operation of chucking it.

Attached to the table by pivots is a connecting arm X., which connecting arm X. is pivotally connected to a lever W. A post T. on the machine frame supports a fulcrum U., which is preferably made in two parts for the purpose of adjusting the posts V. V. to and from each other. The posts V. V. turn upon this fulcrum U., and are connected at the lower end to the lever W. At the upper end of the posts are the feed fingers Y. Y., which extend into the ways C. and are adapted to be withdrawn therefrom as hereinafter described.

Y' Y' also represent feed fingers attached to the lower end of the posts V., and also extending into the feed ways C. It will be observed that when the posts V. V. are vibrated in a vertical plane so as to move the ends of the feed fingers Y. into the ways C., the feed fingers Y'. are withdrawn, thereby allowing the spindle which rests upon the fingers Y' to drop into position to be clamped by the clamps B. B'., while the remaining stock or spindles in the feed way will be held by the feed fingers Y. The forward movement of the table, or the movement toward the cutters by the turning of the cam wheel, withdraws the feed fingers Y', dropping the spindle from the feed fingers and moving forward the feed fingers Y., thereby sustaining the spindle within the feed ways until the spindle which has been dropped has been clamped by the clamp, chucked by the forward movement of the cutter heads, and dropped out of the machine, the object of the feed fingers Y. and Y' being to separate and feed the spindles one at a time to the chucking knives.

Z. Z. are posts or supports on the inner ends of the feed fingers Y and Y'.

The levers H. H. are each provided with a segmental bearing block, shown by 1.

3 and 3' are slots at right angles to each other, passing through the frame to which the fulcrums of the levers are attached. 4 is a binding screw adapted to adjust the bearing at any required position. 5, 5 are set screws. By this construction the fulcrums of the levers H. may be varied, and the levers may be set for longer or shorter work as desired.

6, 6 are slots for adjusting the clamps for holding longer or shorter stock, and 6', 6' are slots for adjusting the clamps for larger or smaller spindles or stock.

7, 7, are slots for adjusting the feed ways to and from each other, the posts and feed fingers being adjusted by means of slots in the fulcrums U. U. The posts V. are composed of a rod 8, extending through the two sleeves 10, 10, said sleeves being separated from each other by means of the fulcrum U.

9, 9, represent washers between the nuts on the rod 8. and the ends of the sleeves.

11 is the drive pulley to which the power is applied, and 12 an idler or loose pulley.

13 is a pulley on the shaft 16, which shaft 16 extends from the drive pulley to the pulley 13.

14 is a pulley on the shaft which drives the cam wheel, and 15 is a belt connecting pulleys 13 and 14.

17 is a pulley on shaft 16, and is connected by means of a belt 18 to the pulley which drives the cutting knives.

The operation of my invention is as follows: The stock to be operated upon is fed into the hopper or ways C. C. Let the finger Y. be withdrawn and it will drop down so that the lower spindle will rest upon the feed fingers Y' Y'. The revolution of the cam wheel will cause the cams O. to move forward the table, operating the parts connected thereto, withdrawing the feed fingers Y' Y', and at the same time pushing forward the fingers Y, separating the lower spindle from those above it in the ways, and allowing it to pass down and be seized by the clamps B. B'. The cutters now advance, chuck the ends of the spindle, and when the same has been chucked, the continued revolution of the cam wheel and the action of the springs R. R. will withdraw the table, and also withdraw the feed fingers Y. Y., allowing another spindle to drop down upon the feed fingers Y' Y'. While this operation is being performed, the action of the cams P. P. upon the push rods J. J., connecting levers H. H., and frame supporting the revolving cutter-heads, pushes forward the cutter-heads in time to begin operation upon the ends of the spindles at the very instant that it is clamped in position to be operated upon, and the reverse motion of the cutter-knives begins just before the spindle is released from the clamps; and thus the operation can be continued, the spindles being fed automatically, seized by the clamps automatically, chucked and dropped out of the machine.

It will be understood that any form of cutting knives can be applied to operate upon the stock when held in the clamps, and I do not wish to limit myself to any peculiar form or shape of knives, nor to the peculiar cut or form cut to be made upon the stock.

Having thus described my invention, what I claim to have invented, and desire to secure by Letters Patent is—

1. In a machine for chucking or operating upon stock, the combination with clamping jaws, and feed ways, of a reciprocating table carrying one set of the clamping jaws, vibrating feed fingers alternately entering the feed ways to feed single pieces of the stock, said fingers connected to and operated by the reciprocation of said table, knives adapted to move simultaneously to and from the stock to be operated upon, adjustable levers connected with said cutters, a wheel having a peripheral cam for moving the reciprocating table forward, said wheel having a cam surface on each of its two sides, for operating upon the levers to move the cutters into engagement with the stock, springs for retracting the reciprocating table, and a spring for moving the cutters away from the stock, substantially as described.

2. In a machine for chucking or operating upon stock, the combination with feed ways, a reciprocating table, and cutters of adjustable vibrating feed fingers, adjustable stock-holding clamps, adjustable levers connected with the cutters, and a wheel provided with three cams, for simultaneously moving the cutters to and from the stock to be operated upon, throwing the feed fingers alternately into and out of the feed ways, and operating the stock-holding clamp, substantially as described.

3. In a machine for chucking or operating upon stock, the combination with a reciprocating table, feed ways, and clamping jaws, of arms X, extending from said table, a lever W, pivotally connected to said arms, a post T supported by the machine frame, posts V, V, carried by the lever W, a two-part fulcrum supported by the post T and connected to the posts V, V, feed fingers Y, Y', carried by the posts V, V, means for vibrating said posts longitudinally movable cutters, and means for operating said cutters, substantially as described.

4. In a machine for chucking or operating upon stock, the combination with suitable frame work a reciprocating table, springs connected with said framework and with the reciprocating table, feed ways and clamping jaws, of arms X extending from said table, a lever W, pivotally connected to said arms, a post T supported by the machine frame, posts V, V, carried by the lever W, a two-part fulcrum supported by the post T and connected to the posts V, V, feed fingers Y, Y', carried by the posts V, V, longitudinally movable cutters, adjustable levers connected with said cutters, rods connected to said levers, a cam wheel engaging said rods and the reciprocating table, substantially as described.

In witness whereof I have hereunto set my hand and seal in the presence of two witnesses.

PETER DOSCH. [L. S.]

Witnesses:
EDWARD TAGGART,
HARRY P. VAN WAGNER.